(12) United States Patent
Bech

(10) Patent No.: US 11,499,529 B2
(45) Date of Patent: Nov. 15, 2022

(54) METHOD OF BALANCING TURBINE BLADES

(71) Applicant: Vestas Wind Systems A/S, Aarhus N. (DK)

(72) Inventor: Anton Bech, Ciudad Real (ES)

(73) Assignee: Vestas Wind Systems A/S, Aarhus N (DK)

( * ) Notice: Subject to any disclaimer, the term of this patent is extended or adjusted under 35 U.S.C. 154(b) by 134 days.

(21) Appl. No.: 17/261,236

(22) PCT Filed: Jul. 19, 2019

(86) PCT No.: PCT/DK2019/050232
§ 371 (c)(1),
(2) Date: Jan. 19, 2021

(87) PCT Pub. No.: WO2020/015803
PCT Pub. Date: Jan. 23, 2020

(65) Prior Publication Data
US 2021/0277874 A1 Sep. 9, 2021

(30) Foreign Application Priority Data
Jul. 20, 2018 (DK) .......................... PA 2018 70495

(51) Int. Cl.
*F03D 13/35* (2016.01)
*F03D 1/06* (2006.01)

(52) U.S. Cl.
CPC ............ *F03D 13/35* (2016.05); *F03D 1/0675* (2013.01); *F05B 2230/60* (2013.01); *F05B 2240/302* (2013.01); *F05B 2260/966* (2013.01)

(58) Field of Classification Search
CPC .... F03D 13/35; F03D 1/0675; F05B 2230/60; F05B 2240/302; F05B 2260/966; Y02E 10/72
See application file for complete search history.

(56) References Cited

U.S. PATENT DOCUMENTS 11,454,216 * 9/2022 Mishra ................. F03D 1/0675
2003/0141721 A1 7/2003 Bartlett
(Continued)

FOREIGN PATENT DOCUMENTS

| EP | 3034861 A1 | 6/2016 |
| EP | 3282121 A1 | 2/2018 |
| WO | 2011032606 A1 | 3/2011 |

OTHER PUBLICATIONS

Danish Patent and Trademark Office, Search and Examination Report in PA 2018 70495, dated Jan. 21, 2019.
(Continued)

*Primary Examiner* — David E Sosnowski
*Assistant Examiner* — Wayne A Lambert
(74) *Attorney, Agent, or Firm* — Wood Herron & Evans LLP

(57) ABSTRACT

There is disclosed a method of balancing a set of first and second modular blade sections for a set of blades of a rotor of a wind turbine. The method comprises determining a mass moment of the first and second blade sections, the mass moment being determined about an axis equivalent to an axis of rotation of a hub of the turbine when the blade section is assembled onto the hub. A plurality of blade section groups 10 are defined, each comprising a first blade section of the set and at least one second blade section of the set, each blade section group having a blade section group mass moment about the axis. The first blade section and the at least one second blade section in each group are selected so as to satisfy a minimised total ballast condition, to minimise balancing ballast to be added to the set as a whole, or a minimised 15 ballasting difference condition, to minimise the difference in balancing ballast added to different blades, or both.

20 Claims, 6 Drawing Sheets

(56) References Cited

U.S. PATENT DOCUMENTS

| | | |
|---|---|---|
| 2011/0123343 A1 | 5/2011 | Ronner |
| 2018/0044002 A1* | 2/2018 | Cotton .................. F04D 29/662 |
| 2018/0045174 A1* | 2/2018 | Yarbrough ................ F03D 9/25 |
| 2018/0051672 A1* | 2/2018 | Merzhaeuser .......... F03D 13/10 |
| 2019/0010928 A1* | 1/2019 | Vind ....................... F03D 13/10 |

OTHER PUBLICATIONS

European Patent Office, International Search Report and Written Opinion in PCT Application No. PCT/DK2019/050232, dated Oct. 9, 2019.

* cited by examiner (a)

(b)

(a)

(b)

METHOD OF BALANCING TURBINE BLADES

FIELD OF THE INVENTION

The present invention relates to a method of balancing wind turbine blades, and a set of balanced blades for a rotor of a wind turbine.

BACKGROUND OF THE INVENTION

A wind turbine blade may be manufactured in two or more sections: commonly, a root section and a tip section. These are assembled to each other to form a blade for installation onto a hub of a wind turbine. For a wind turbine having three blades, provision of, for example, three identical root sections and three identical tip sections should provide three identical blades. However, in practice, variability in the manufacturing processes for the root and tip sections can mean that the assembled blades are often not identical to each other. Variations in the different blades can create instability and undesirable vibrations. The assembled blades must therefore be balanced, otherwise rotation of the blades around a hub of the turbine can provide uneven forces on the hub and can result in an unstable wind turbine.

The inventor of the present invention has identified that there is a need for an efficient method of balancing wind turbine blades.

SUMMARY OF THE INVENTION

A first aspect of the invention provides a method of balancing a set of modular blade sections for a set of blades of a rotor of a wind turbine, the method comprising the steps of:
- providing the set of modular blade sections, the set comprising a plurality of first blade sections and a plurality of second blade sections;
- determining a mass moment of each first blade section and of each second blade section, the mass moment being determined about an axis equivalent to an axis of rotation of a hub of the turbine when the blade section is assembled onto the hub; and
- defining a plurality of blade section groups, each comprising a first blade section of the set and at least one second blade section of the set, each blade section group having a blade section group mass moment about the axis, the first blade section and the at least one second blade section in each group being selected so as to:
- minimise a sum of differences between:
  - the group mass moment of the blade section group having the highest group mass moment of the plurality of blade section groups; and
  - the group mass moment of each of the remaining blade section groups; or
- minimise a difference in mass moment between:
  - the group mass moment of the blade section group or groups having the highest group mass moment of the plurality of blade section groups; and
  - the group mass moment of the blade section group or groups having the lowest group mass moment of the plurality of blade section groups.

As a person skilled in the art will appreciate, the "mass moment" of an object is a product of (i.e. multiplication of) the mass of the object, and the distance of the mass from a reference point or axis. This may be an axis about which the object moves, specifically rotates, in use. Units of mass moment may be kgm. The mass moment can be determined in practice by multiplying the overall mass of the object by the distance of the centre of mass from the reference point or axis. When reading the present disclosure, a person skilled in the art will appreciate that the "group mass moment" of a blade section group is a sum of (i.e. addition of) the mass moments of the blade sections within the group. For example, for a group consisting of a root blade section and a tip blade section, the group mass moment can be considered the mass moment of the root section plus (added to) the mass moment of the tip section.

The sum of differences may be a collective (i.e. total), difference in group mass moment between the group mass moment of the blade section group having the highest mass moment of the plurality and the group mass moment of the remaining blade section groups. The first blade section may be an inner or root blade section. The second blade section may be an outer or tip blade section. Other blade section types can be envisaged, though each numbered blade section is generally of the same type and overall form as other commonly-numbered blade section types. For example, the first blade sections may all be root blade sections, while the second blade sections may all be tip blade sections. Blades with larger numbers of sections (for example more than two) may be envisaged, and so the different section types may include any combination of radially inner blade sections or radially outer blade sections. Blade sections may be arranged in a number of configurations to create a blade for a rotor and so any selection of sections of a blade, which are configured to be assembled together to make a blade, can be balanced using the methods described herein.

Minimisation of a sum of differences between:
- the group mass moment of the blade section group having the highest group mass moment of the plurality of blade section groups; and
- the group mass moment of each of the remaining blade section groups; has the advantage of minimising the mass moment that would be needed to balance the blades (i.e. to provide a substantially equal mass moment between the plurality of blade section groups), and thus minimise the amount of mass moment added to the rotor. Especially where mass moment is added to blades at a common radial position or positions, this generally means that the amount of mass added to the blade set as a whole can also be minimised in this way.

This allows for an arrangement, and thus rotor, which has the lowest possible mass moment, and can also result in the rotor having the lowest overall mass, whilst achieving a balanced set of blades. This has numerous associated advantages in terms of ease of installation, long term performance, maintenance and running costs, efficiency and fatigue life of the wind turbine.

Minimisation of a difference in mass moment between:
- the group mass moment of the blade section group or groups having the highest group mass moment of the plurality of blade section groups; and
- the group mass moment of the blade section group or groups having the lowest group mass moment of the plurality of blade section groups, enables the mass moment added (which in most practical implementations correlates to the mass to be added) to be more evenly spread out between blades. This has the advantage of providing a further balanced arrangement, by distributing supplementary mass (such as ballast) added between the 'lighter' blades (i.e. those with a lower mass moment than the blade with the highest mass moment) more evenly.

Both options of the above method allow for the mass moment determination, or calculation, to be taken into account at an early stage in the method of assembling blades, and allow this calculation to be used to assign blade sections to blade section groups in an effective and efficient manner. It will be appreciated from the disclosure that either or both of the above minimisation conditions may be met in various different arrangements of blade sections. Thus, the first blade section and the at least one second blade section in each group can be selected so as to satisfy a minimised total ballast condition, to minimise balancing ballast to be added to the set as a whole, or a minimised ballasting difference condition, to minimise the difference in balancing ballast added to different blades, or both.

The method may further comprise the step of providing identifying means, identifying each first blade section and each second blade section of the set as belonging to its respective blade section group. The identifying means may comprise a set of instructions, physical or electronic, or a set of markings on one or more of the blade section themselves.

The method may further comprise the step of providing ballast to at least one of the plurality of blade section groups to provide a mass moment equal to the blade section group or groups having the highest mass moment.

The method may comprise the step of providing ballast to each of the plurality of blade section groups having a group mass moment less than the maximum group mass moment, to provide balanced blade section groups having the same group mass moment as each other.

Preferably, no ballast is added to the blade section group having the highest group mass moment of the plurality of blade section groups.

The step of defining a plurality of blade section groups may include providing a blade section group comprising:
  a first blade section having the highest mass moment of the first blade sections; and
  a second blade section having the lowest mass moment of the second blade sections. This has the advantage of providing a simple characterising step for assigning the blade sections into blade section groups. The step of defining a plurality of blade section groups may include defining three blade section groups.

Determining the mass moment of a first or second blade section may comprise weighing the first and/or second blade section. Weighing either or each of the first blade section and the second blade section may include simultaneously weighing at least two locations on the weighed first blade or second blade section. One of the locations may be at an inner end of the blade section and the other of the locations may be at an outer end of the blade section. As a person skilled in the art will appreciate, the terms "inner" and "outer" used herein are used in relation to innermost and outermost parts of the wind turbine rotor, with an inner part or location being closer to an axis of rotation of the rotor than an outer part or location.

Ballast, or supplementary mass, may be provided at or adjacent:
  an outer end of one or more inner blade sections; and/or
  an inner end of one or more outer blade sections.

Ballast may be added to a shear web portion of one or more of the first or second blade sections.

Addition of ballast to a blade section group may comprise adding one or more of: granular material such as sand; a solid material such as a metal; a liquid; a curable fluid, such as a curable polymer, preferably curable polyurethane. Addition of ballast to a blade section group may comprise removably attaching ballast to the blade section group. For example, addition of a solid material such as a solid metal plate may enable the ballast to be removable. Addition of ballast to a blade section group may involve bolting the ballast to the blade section group.

The method may further comprise the step of assembling the first blade section and the at least one second blade section within each blade section group to one another to form a set of blades for a rotor of a wind turbine. The set of blades may comprise three blades although sets comprising a different number of blades are envisaged.

The method may further comprise the step of assembling the plurality of blade section groups onto a wind turbine hub, such that each blade section group forms a wind turbine blade, the wind turbine blades having an equivalent mass moment, about an axis of rotation of a hub of the turbine, to one another.

There may be provided a set of blades for a rotor of a wind turbine, wherein each blade comprises a blade section group comprising a first blade section and at least one second blade section, each blade section group having a blade section group mass moment about an axis equivalent to an axis of rotation of a hub of the turbine when the blade section is assembled onto the hub;
  wherein, excluding any supplementary balancing mass added to the blades, the first blade section and the at least one second blade section in each group are selected so as to:
  minimise a sum of the differences between:
    the group mass moment of the blade section group having the highest group mass moment of the plurality of blade section groups; and
    the group mass moment of each of the remaining blade section groups; or
  minimise a difference in mass moment between:
    the group mass moment of the blade section group or groups having the highest group mass moment of the plurality of blade section groups; and
    the group mass moment of the blade section group or groups having the lowest group mass moment of the plurality of blade section groups.

The set of blades may further comprise ballast provided to at least one of the plurality of blade section groups, to provide a mass moment equal to the blade section group having the highest mass moment.

The ballast may comprise one or more of the following: granular material such as sand, a block or plate of material such as a steel block or plate, a liquid such as a curable polymer, specifically curable polyurethane.

A further aspect of the invention provides a set of modular blade sections for a set of blades of a rotor of a wind turbine, the set comprising:
  a plurality of first blade sections and a plurality of second blade sections;
  identifying means, identifying each first blade section and each second blade section as belonging to one of a plurality of blade section groups;
  wherein each blade section group comprises a first blade section of the set and at least one second blade section of the set, each blade section group having a blade section group mass moment about an axis equivalent to an axis of rotation of a hub of the turbine when the blade section is assembled onto the hub, the first blade section and the at least one second blade section in each group being selected, excluding any supplementary balancing mass added to the blades, so as to:

minimise a sum of the differences between:
the group mass moment of the blade section group having the highest group mass moment of the plurality of blade section groups; and
the group mass moment of each of the remaining blade section groups;

or minimise a difference in mass moment between:
the group mass moment of the blade section group or groups having the highest group mass moment of the plurality of blade section groups; and
the group mass moment of the blade section group or groups having the lowest group mass moment of the plurality of blade section groups.

As a skilled reader will appreciate, any or all of the above and the following features may be combined in any way in order to realise the benefits of the invention.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
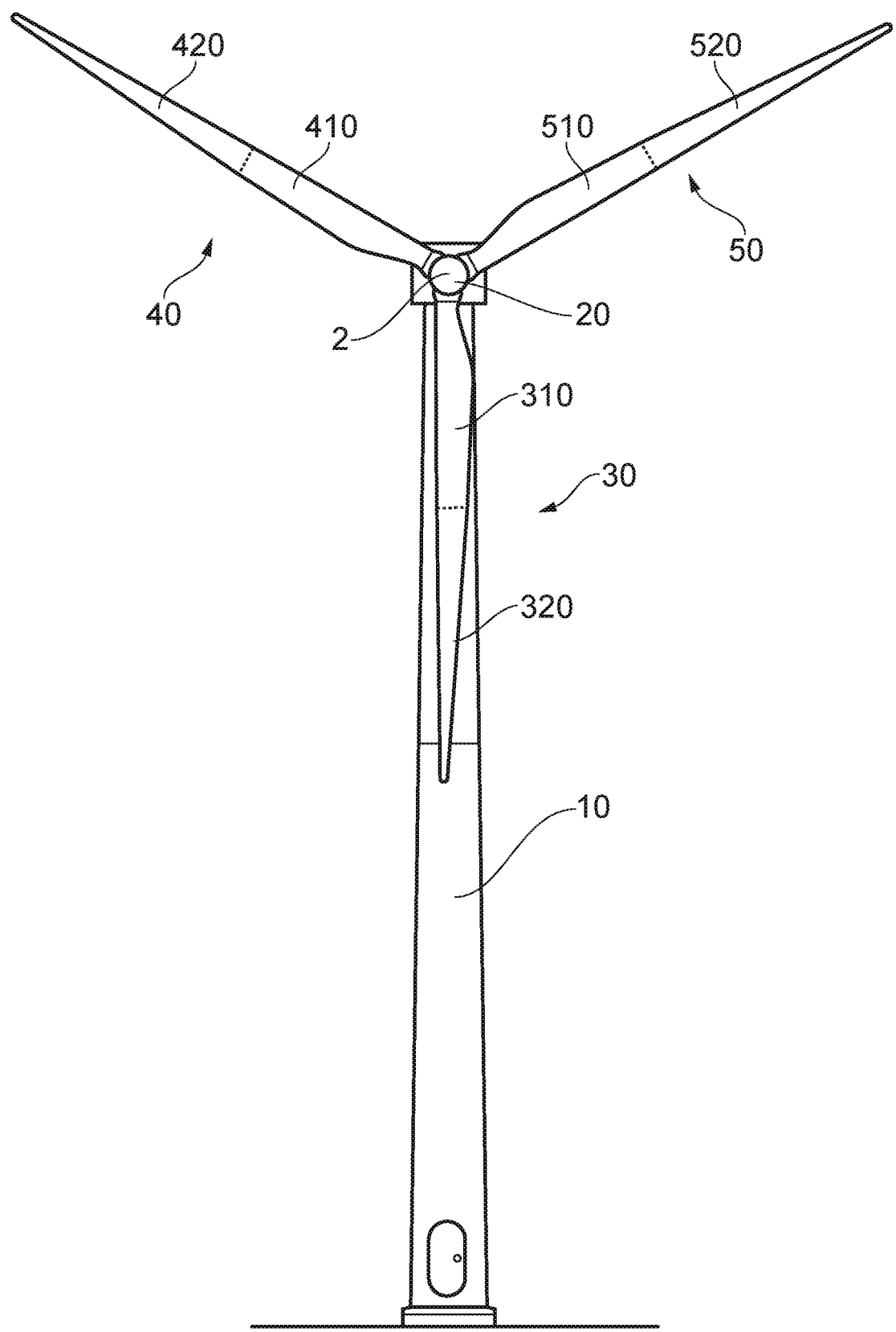
FIG. 1 shows a wind turbine.

In this specification, a number of well-known terms are used. While many of these terms are well known and understood to a person skilled in the art, definitions are given below to assist the reader in their correct interpretation.

As used herein, the term "blade section" refers to a section of a blade which is comprised in a blade when fully assembled, for example a modular component used to construct a blade having a plurality of modular components. Typically, a blade section forms a part of an outer surface of the blade. A lateral cross-section of the blade section may have at least one surface arranged to form a part of the aerofoil shape of the blade.

The terms "first" and "second" used herein in relation to blade sections are used to differentiate between blade sections of a different type. Blade sections within the first group may be of a first type and blade sections of the second group may be of a second type. Blade sections of the same type (i.e. first or second) may have substantially the same shape, size, configuration, mass, mechanical and/or structural properties as each other, as far as manufacturing limitations will allow. Blade sections of the same type may be configured for use in the same or equivalent position or location on their respective blade as each other. A "first blade section" as used herein is a blade section of a different type to a "second blade section". Blade sections of a different type may have substantially different shapes, sizes, configurations, masses, mechanical and/or structural properties to each other. Blade sections of a different type may be configured for use in a different position or location on their respective blades with respect to each other.

The term "blade section group" refers to a plurality of blade sections of different types. Fundamentally, a blade section group is a blade, comprising any number of blade sections, arranged in an assembled or unassembled state. For example, a blade section group may comprise a first blade section and a second blade section. Equally, a blade section group may comprise a root blade section and a tip blade section.

The terms "root" and "tip" used herein will be understood as a term of art by the skilled person, but for the avoidance of doubt, the term "root" refers to a blade section which is configured for, or may be adapted for, attachment to a hub 20 of a turbine 1, and the term "tip" used herein in relation to a blade section, refers to a blade section which is configured for, or may be adapted for, attachment to another blade section such that it is an outermost section of a blade, i.e. the blade section furthest away from the axis of rotation 2 of the hub 20.

The terms "inner" and "outer" used herein are used in relation to a distance relative to the hub 20 of a turbine 1. The term "inner" is used to describe a component which is closer to the hub of the turbine than an "outer" component.

The term "mass moment" is described in more detail in a later section, with reference to various examples. In short, the mass moment of an object is the product (i.e. multiple of) the mass of an object, and the distance of the centre of mass of the object from a centre or axis of rotation about which the object can move.

The term "unbalanced mass moment" used herein refers to the mass moment of an object, which may be a blade section, or blade section group, or blade, before it has been balanced, i.e. before supplementary mass or ballast has been added. Unbalanced mass moment of a blade section may be referred to herein as "mmu" and unbalanced mass moment of a blade section group may be referred to herein as "MMu".

Equally, the term "balanced mass moment", used herein refers to the mass moment of an object, which may be a blade section, or blade section group, or blade, after it has been balanced, i.e. after supplementary mass or ballast has been added. Balanced mass moment of a blade section may be referred to herein as "mmb" and unbalanced mass moment of a blade section group may be referred to herein as "MMb".

The term "ballast" used herein refers to a mass suitable for use as a supplementary mass for a wind turbine, and may be suitable for, configured for or adapted for attachment to a blade or a blade section of a wind turbine.

FIG. 1 shows a wind turbine 1. The wind turbine 1 comprises a tower 10, a hub 20, and a plurality of blades 30, 40, 50. As shown in FIG. 1, the wind turbine 1 comprises a plurality of blades, such as three blades 30, 40, 50. The wind turbine 1 comprises at least one rotor, configured for rotation about a central axis 2, which may comprise the three blades 30, 40, 50, and comprises the hub 20. The rotor may be mounted to the turbine tower 10 by means of a bearing so that the rotor can rotate about the rotor axis 2 and can be connected to a generator of the turbine by known means. A skilled person will be familiar with the means necessary to generate electrical power from movement of a rotor and so such means are not described herein in any further detail.

Figure 2:
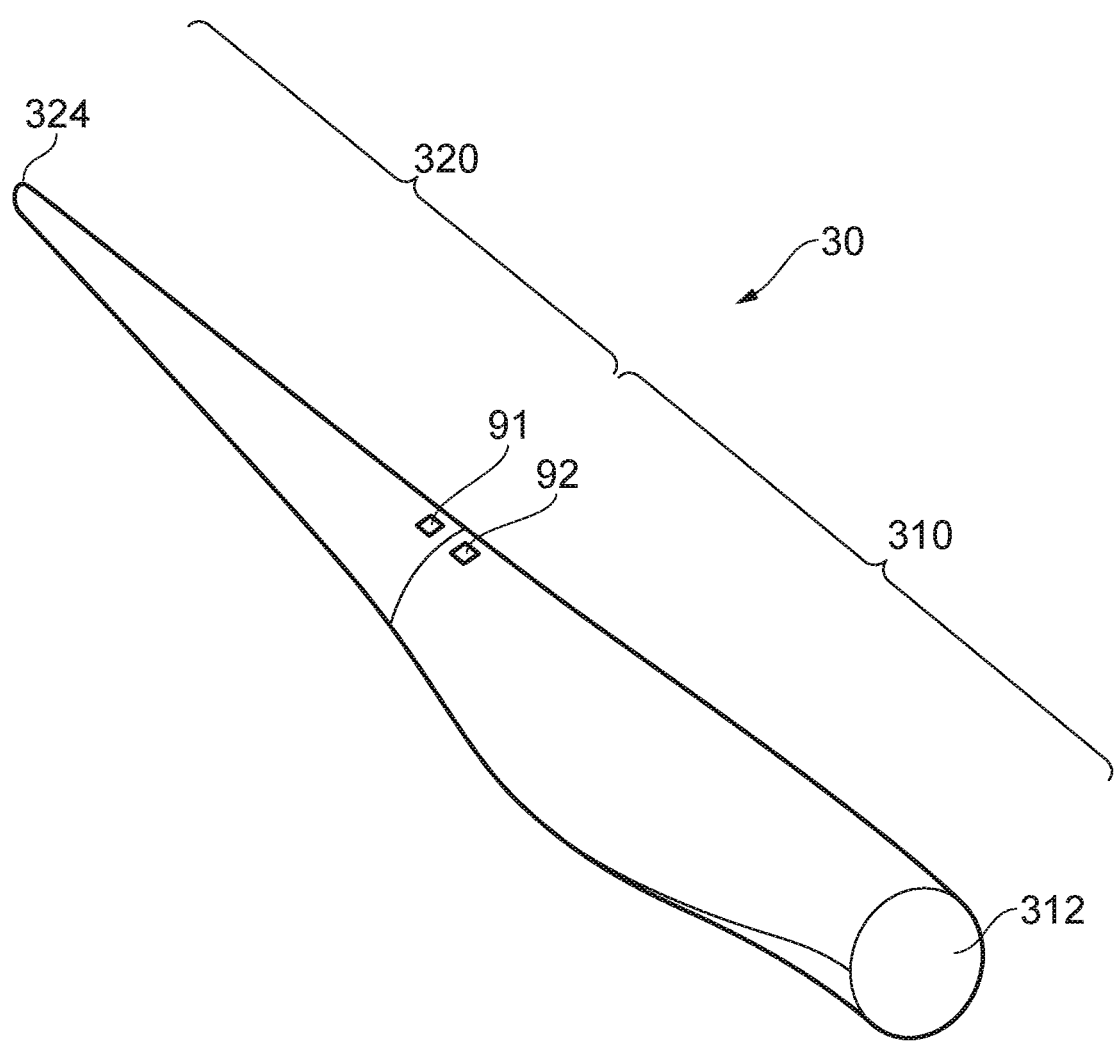
FIG. 2 shows a wind turbine blade.
Figure 3:
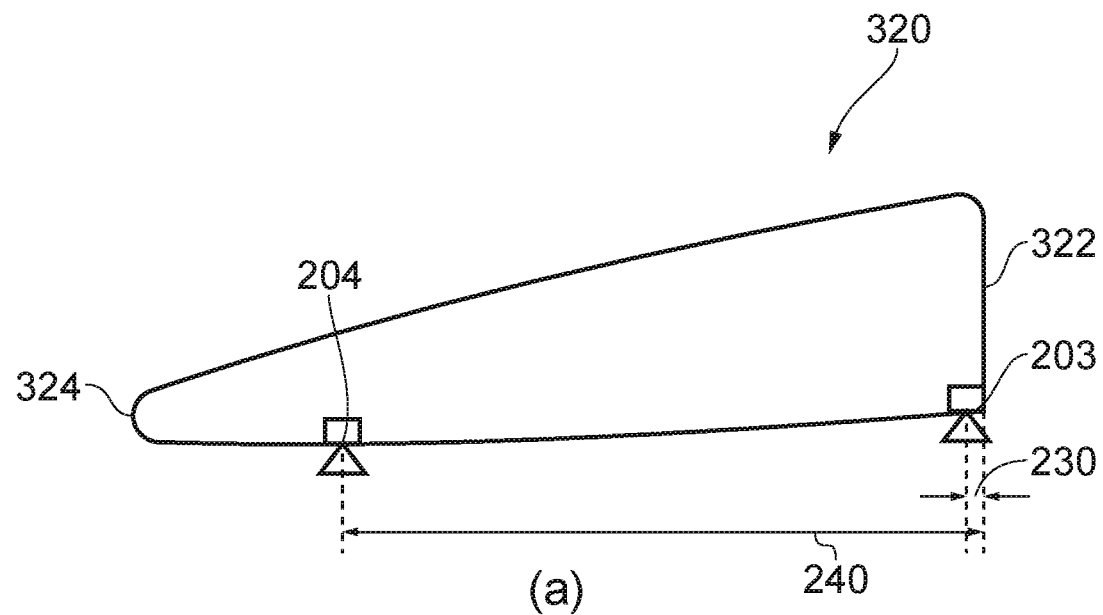
FIGS. 3a and 3b show a wind turbine blade tip and root respectively.
Figure 3:
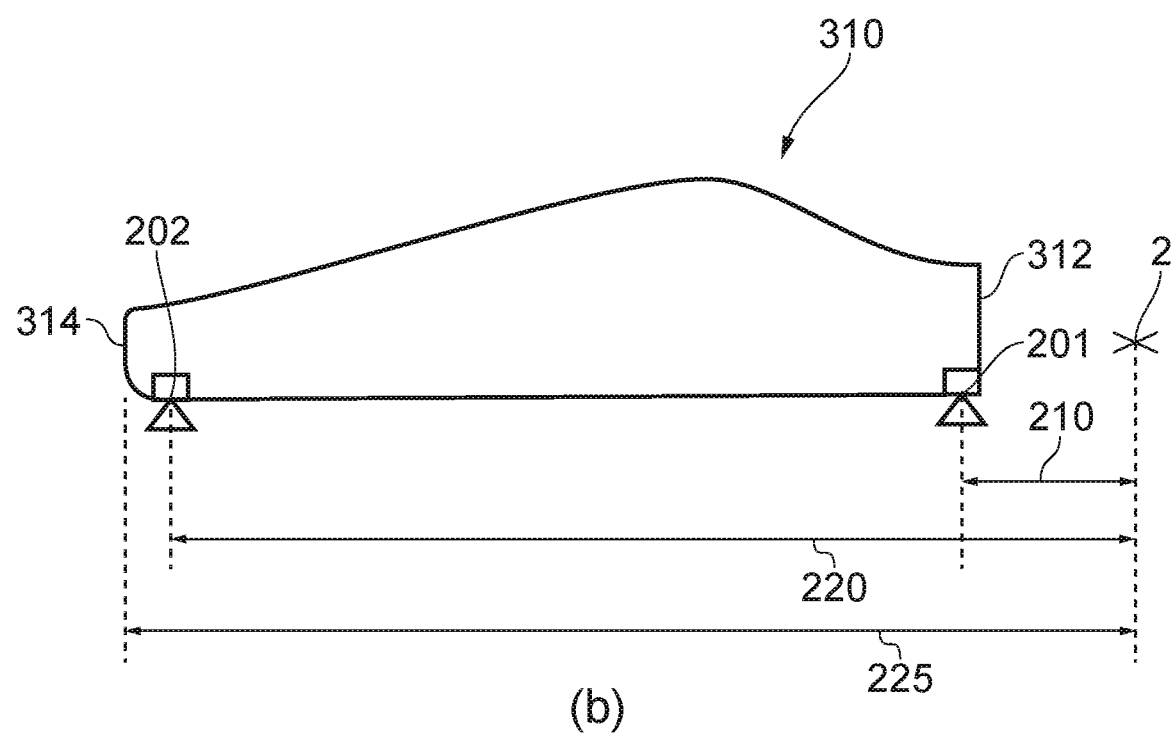

FIG. 2 shows a wind turbine blade 30. The wind turbine blade 30 shown in FIG. 2 may be implemented for any or all blades shown in the wind turbine of FIG. 1. As shown in FIG. 2, the blade may comprise a first and a second blade section 310, 320, such as an inner and outer blade section. The first blade section 310 may be a root blade section 310 and the second blade section 320 may be a tip blade section 320. These may comprise a root end 312 and a tip end 324. The blade 30 may be configured such that a root end 312 of the blade 30 is mounted to the hub 20 of the turbine 1. The blade 30 may be configured such that a tip end 324 is provided as an outermost part of the blade 30 when the blade 30 is mounted to the hub 20 of the turbine 1. As shown in FIGS. 3 (a) and (b), the root blade section 310 may have an inner end 312 and an outer end 314, and the tip blade section 320 may have an inner end 322 and an outer end 324.

The inventor has identified that there is a need to balance efficiently the blades 30, 40, 50, and more specifically balance any set of blade sections making up a blade, such as blade sections 310, 320, of a wind turbine 1, so that when the blade sections 310, 320 are assembled onto the turbine 1, a balanced blade configuration is provided.

The inventor has developed a method of balancing a set of modular blade sections for a set of blades 30, 40, 50 of a rotor of a wind turbine 1, and has determined that the most appropriate reference point for determining the mass moment of a blade section is with reference to the scenario in which they are used, i.e. when mounted to a hub 20 of a wind turbine 1. The axis of rotation 2 of the hub 20 is therefore the point with reference to which the relevant mass moments are calculated.

The method of balancing blades of a turbine described comprises a number of steps. The steps may not necessarily be carried out in exactly the order described in the following, however a skilled reader will appreciate that there are advantages to following some or all of the order in which the steps are described in the following.

In one step, a set of modular blade sections 310, 410, 510, 320, 420, 520, is provided. The set 310, 410, 510, 320, 420, 520, comprises a plurality of root blade sections 310, 410, 510 and a plurality of tip blade sections 320, 420, 520.

The method includes determining a mass moment of each root blade section 310, 410, 510 and of each tip blade section 320, 420, 520. In the method of the invention, the mass moment is determined about an axis 2, taken as a reference axis for the determination of the mass moment. The reference axis 2 is equivalent to an axis of rotation of a hub 20 of the turbine when the blade section or section(s) is/are assembled onto the hub 20. This means its position and orientation relative to the root and/or tip, and/or further blade sections for the determination of mass moment is as it would be once the blade section is mounted to the hub of the turbine in operation.

The method further includes defining a plurality of blade section groups. Each of the groups comprises a root blade section 310, 410, 510 of the set and at least one tip blade section 320, 420, 520 of the set. Each blade section group will have a blade section group mass moment about the axis 2. This can be derived by summing the mass moments of each blade section in a blade section group. Advantageously, in the methods described herein, the root blade section 310, 410, 510 and the at least one tip blade section 320, 420, 520 in each group are selected so as to satisfy at least one of two primary conditions or scenarios described in the following.

A first condition or scenario seeks to minimise a sum of differences between the group mass moment of: i) the blade section group which has the highest group mass moment of the plurality of blade section groups; and ii) the group mass moment of each of the remaining blade section groups. This will be referred to herein as a "minimised total ballast" condition, since this condition allows the amount of additional mass moment (i.e. ballast) required to balance the rotor to be minimised.

A second condition or scenario seeks to minimise a difference in mass moment between (a) the group mass moment of the blade section group or groups having the highest group mass moment of the plurality of blade section groups; and (b) the group mass moment of the blade section group or groups having the lowest group mass moment of the plurality of blade section groups. This will be referred to herein as a "minimised ballasting difference" condition, since it allows the difference between amounts of ballast which must be added to different blades to be minimised. Therefore, the spread of additional mass, which is typically added as point masses to the blade, can be minimised, which can assist with dynamic stability of the turbine.

By way of example, a mass moment calculation is outlined below for a set of blades, by reference to which the primary scenarios explained above are illustrated in further detail. As will become apparent from the following description, other scenarios can be further beneficial in certain configurations of the blade sections.

Blade Mass Moment Calculation

An example of a calculation of mass moment of blades 30, 40, 50 of a wind turbine 1 is described below with reference to FIGS. 3(a) and (b). FIGS. 3(a) and (b) show a blade root section 310 and a blade tip section 320. FIG. 3(b) also shows point 2, which demonstrates the relative position of the axis 2 of the hub 20 to the root section 310, when the root section 310 is installed onto the hub 20. In the view shown in FIG. 3(b), the axis is represented as a cross, marking a point, which represents the axis 2 intersecting a plane defined by the view (i.e. by the page).

The mass moment determination for a blade section 310, 320 may comprise weighing the respective blade section 310, 320. Weighing may be achieved by using mechanical, hydraulic, pneumatic or digital scales, using a balance, or any appropriate means for determining the mass, that would be known to the skilled person.

A person skilled in the art will appreciate that although weighing is provided herein as one possible way of determining the mass of the respective blade section, the method may be carried out on blade sections or blades for which the weight or mass is already known.

The blade sections 310, 320 may be weighed at a plurality of locations, or points, along their length (i.e. between their inner and outer ends). With reference to FIGS. 3(a) and (b), the blade section 310, 320 may be weighed at two points 201, 202; 203, 204 along its length. One of the two points may be located at or proximate to an inner end 312, 322 of the respective blade section 310, 320. The other of the two points may be at or proximate an outer end 314, 324 of the respective blade section 310, 320. A particular blade section 310, 320 may be weighed such that a mass determination is made at both points 201, 202; 203, 204 on the particular blade section 310, 320 simultaneously.

The distance between each of the points 201, 202, 203, 204 at which the blade sections 310, 320 are weighed and the axis 2 may be determined, for example by calculation or measurement. With reference to FIGS. 3 (a) and (b), the inner point 201 of the root blade section 310 is a distance 210 from the axis 2. The outer point 202 of the root blade section 310 is a distance 220 from the axis 2. The inner point 203 of the tip blade section 320 is a distance 230 plus a distance 225 from the axis 2. The outer point 204 of the tip blade section 320 is a distance 240 plus a distance 225 from the axis 2.

For ease of reference, the distance of the inner point 201 of the root blade section 310 from the axis 2 is referred to herein as $r_1$; the distance of the outer point 202 of the root blade section 310 from the axis 2 is referred to herein as $r_2$; the distance of the inner point 203 of the tip blade section 320 from the axis 2 is referred to herein as $r_3$; and the distance of the outer point 204 of the tip blade section 320 from the axis 2 is referred to herein as $r_4$. The mass measured at each of points 201, 202, 203, 204, are referred to herein as $m_1$, $m_2$, $m_3$ and ma respectively.

The total mass moment of the blade section group, or of the blade 30 before any ballast is added (MMu) is then calculated as follows.

The unbalanced mass moment of a blade section (mmu) is, as a skilled person will appreciate and as described previously, the product of the mass of the blade section, and the distance of the centre of mass from the axis of movement or rotation 2 (i.e. the mass of the blade section multiplied by the distance of the centre of mass from the axis of movement or rotation). The axis of movement or rotation 2 may be an axis equivalent to an axis of rotation of a hub of a turbine when the blade section is assembled onto the hub. A skilled person will appreciate that the unbalanced mass moment (mmu) may be the sum of: the mass at each point weighed, multiplied by the distance of each point from the axis of movement or rotation 2. The mass moment of each root blade section 310, 410, 510, and each tip blade section 320, 420, 520, may be determined in this way.

The total unbalanced mass moment of the blade sections 310, 320 in a group, e.g. of blade 30 is the sum of the products of the masses determined, multiplied by the distance of that determined mass from the axis of rotation 2. This is referred to as a "group mass moment", specifically an unbalanced group mass moment, or "MMu", which may refer to an unassembled, unbalanced, state, as well as to the assembled, unbalanced, state of the blade 30 or part of the blade 30, in which there is a group of blade sections 310, 320.

The unbalanced group mass moment of a blade section group can be represented by:

$$MMu = \Sigma mmu_x$$

Where MMu is the total unbalanced mass moment of a blade section group, and $mmu_x$ is the unbalanced mass moment of each blade section in a group of x blade sections. Otherwise stated, the total unbalanced mass moment of a blade section (MMu) group is a sum of the unbalanced mass moments (mmu) of each blade section within the group.

The unbalanced mass moment of a blade section group (MMu) is a sum of the product of each mass of each blade section, multiplied by the distance of that mass from the axis of rotation 2, which can be represented as:

$$MMu = \Sigma(m_x * r_x)$$

Where x denotes the weighed location and mass in question, for example blade sections weighed at four points, x=[1, 2, 3, 4]. A skilled person will appreciate that $m_1$ to $m_4$ and $r_1$ to $r_4$ are as defined above, $\Sigma$ denotes the sum of the values in parentheses, and * denotes a product, or "multiply" symbol.

As already discussed, it can be advantageous to weigh each blade section at two locations simultaneously. In this situation, there will be two values of $m_x * r_x$ per blade section. For the example shown in FIGS. 3(a) and (b), the unbalanced group mass moment (MMu) of the blade 30 is:

$$MMu = \Sigma(m_1 * r_1 + m_2 * r_2 + m_3 * r_3 + m_4 * r_4)$$

For a rotor of a wind turbine 1, the group mass moment of each blade 30, 40, 50, is calculated in the manner described above.

By means of illustrative example only, the unbalanced group mass moments MMu of three blades in one example are:

$$MMu(\text{blade1}) = 183000 \text{ kgm}$$

$$MMu(\text{blade2}) = 188000 \text{ kgm}$$

$$MMu(\text{blade3}) = 189000 \text{ kgm}$$

In this example, the blade having the highest group mass moment of the three blades is blade 3, with a group mass moment of 189000 kgm. The difference in group mass moment ($\Delta_1$) between blade 1 and the blade having the highest group mass moment (blade 3) is 6000 kgm. The difference in group mass moment ($\Delta_2$) between blade 2 and the blade having the highest group mass moment (blade 3) is 1000 kgm.

In summary:

$$\Delta_x = MMu(\text{blade}_{max}) - MMu(\text{blade } x), so:$$

$$\Delta_1 = MMu(\text{blade3}) - MMu(\text{blade1}) = 6000 \text{ kgm}$$

$$\Delta_2 = MMu(\text{blade3}) - MMu(\text{blade2}) = 1000 \text{ kgm}$$

$$\Delta_3 = MMu(\text{blade3}) - MMu(\text{blade3}) = 0$$

In order for the blades to have an equal group mass moment to each other, the group mass moment of blade 1 needs to be increased by 6000 kgm, and the group mass moment of blade 2 needs to be increased by 1000 kgm.

In this example, mass is added to blades 1 and 2 at an outer end of the root blade section 310, 410, i.e. point 202 on each of blades 1 and 2.

The mass added to point 202 of blade 1 is 6000 kgm divided by the distance of point 202 from the axis 2 (i.e. $r_2$). The mass added to point 202 of blade 2 is 1000 kgm divided by the distance of point 202 from the axis 2 (i.e. $r_2$).

If $r_2$ is 40 m, for example, then the mass added to point 202 of blade 1 is 150 kg, and the mass added to point 202 of blade 2 is 25 kg.

The mass moment of each blade after this additional mass, or ballast, is added (i.e. the balanced mass moment, or "MMb") is then as follows:

$$MMb(\text{blade1}) = 183000 \text{ kgm} + (40 \text{ m} * 150 \text{ kg}) = 189000 \text{ kgm}$$

$$MMb(\text{blade2}) = 188000 \text{ kgm} = (40 \text{ m} * 25 \text{ kg}) = 189000 \text{ kgm}$$

$$MMb(\text{blade3}) = 189000 \text{ kgm}$$

Minimised Total Ballast Condition

The example of a mass moment calculation and balancing method above is provided for a specific arrangement of blade sections within each blade section group. As a person skilled in the art will appreciate in light of the teaching herein, there are numerous ways in which the blade sections can be grouped together to form blade section groups. Any root blade section could be grouped with any tip blade section to form a blade. Different arrangements of blade sections into blade section groups may provide blade section groups having different group mass moments. As will be appreciated, a blade may have more than two sections, and the concepts described herein can be used to determine the most efficient configurations of any number of multiple blade sections, in order to minimise an amount of mass or mass moment which needs to be added to blades of a rotor of a turbine in order to provide a balanced set of blades to the rotor.

As stated above, a "minimised total ballast condition" is used to describe minimisation of a sum of differences between:

the group mass moment of the blade section group having the highest group mass moment of the plurality of blade section groups; and the group mass moment of each of the remaining blade section groups. This is a way in which the total amount of ballast required in order to balance the blade set for a rotor can be minimised.

In the "Blade mass moment calculation" above, there are defined three blade section groups, with one group per blade 30, 40, 50, each blade section group comprising a root blade section 310 and a tip blade section 320. The sum of differences with respect to the "Blade mass moment calculation" above is $\Delta_1+\Delta_2+\Delta_3$ Given that by definition $\Delta_{(max)}$ is always zero (i.e. the highest group mass moment minus the highest group mass moment), the sum of differences is equal to $\Delta_1+\Delta_2$, as $\Delta_{(3)}=\Delta_{(max)}=0$.

A minimisation of a sum of differences between:

the group mass moment of the blade section group having the highest group mass moment of the plurality of blade section groups; and the group mass moment of each of the remaining blade section groups; can therefore be represented by a minimisation of $\Delta_1+\Delta_2+\Delta_3$, where at least one of $\Delta_1$, $\Delta_2$, and $\Delta_3$ corresponds to a difference between the blade having the highest mass moment and itself, and is therefore zero. There may be an instance in which two unbalanced groups happen to have the same group mass moment, and so it is possible that more than one of $\Delta_1+\Delta_2+\Delta_3$ is equal to zero.

The minimisation of a sum of differences between the blade section groups may be achieved by arranging (e.g. pairing) the blade sections such that the mass moment of the blade section group having the highest mass moment is the lowest achievable for the given set of blade sections. This situation may be arrived at by taking the blade section (either root or tip blade section 310, 320) out of all of the blade sections, which has the highest mass moment, and pairing it with a blade section which has the lowest mass moment of the corresponding blade sections (i.e. of the blade section of a different type). For example, if a root blade section has the highest mass moment out of all of the blade root sections then it is paired with the tip blade section with the lowest mass moment. Alternatively, if a tip blade section has the highest mass moment out of all of the blade tip sections then it is paired with the root blade section with the lowest mass moment. In other words, the root blade section having the highest mass moment of all the root blade sections may be paired with the tip blade section having the lowest mass moment of all the tip blade sections; or the tip blade section having the highest mass moment of all the tip blade sections may be paired with the root blade section having the lowest mass moment of all the root blade sections.

A skilled person will appreciate that minimisation of the sum of differences of the blade section groups may be achieved in other ways, and is not limited by this specific example. A minimisation of the sum of the differences of the blade section groups has the direct result of allowing a minimum mass moment to be added to the arrangement, and thus to the rotor. This allows for an arrangement, and thus rotor, which has the lowest possible mass moment. As a skilled person will appreciate given the above teaching, this has advantages in terms of performance, cost, efficiency and fatigue life of the wind turbine 1.

Minimised Ballasting Difference Condition

As stated above, minimisation of a difference in mass moment between: the group mass moment of the blade section group having the highest group mass moment of the plurality of blade section groups; and the group mass moment of the blade section group having the lowest group mass moment of the plurality of blade section groups, is referred to herein as the "minimised ballasting difference condition". This is because this is a way in which the total amount of ballast to be added in order to balance the blade set for a rotor can be most evenly spread out between blades.

The minimised ballasting difference condition is a condition in which the blade section groups are arranged so as to spread out the mass to be added between blade section groups. Specifically, where mass is to be added to more than one blade section group, this condition requires that the mass moment, which may correlate to the mass to be added to these blade section groups is spread out as evenly as possible, while still providing blades which have equal mass moments to each other.

For example, instead of adding a significant amount of ballast to one blade section group, and a small amount to another blade section group, the ballast to be added is more evenly spread between the blade section groups. In relation to a set of three blade section groups for three blades, two of these blade section groups may require added ballast to have a group mass moment equal to a group mass moment of the third blade section group with the highest group mass moment. If the two blade section groups which need mass adding each comprise two blade sections, then they may be arranged in two different ways, (i.e. by two different combinations of root and tip sections). One combination may provide one blade section group having a relatively high group mass moment and one blade section group having a relatively low group mass moment. The other combination may provide two blade section groups having group mass moments which may be either roughly equivalent, or at least more similar to each other than for the first combination. Combinations of blade sections which provide blade section groups having more similar group mass moments can allow any added ballast or mass to be more evenly spread between these groups. Where a combination or arrangement provides a minimum in the difference between remaining groups (i.e. the situation where the remaining group mass moments are closer in value), this is referred to as a "minimised ballasting difference condition".

Figure 6:
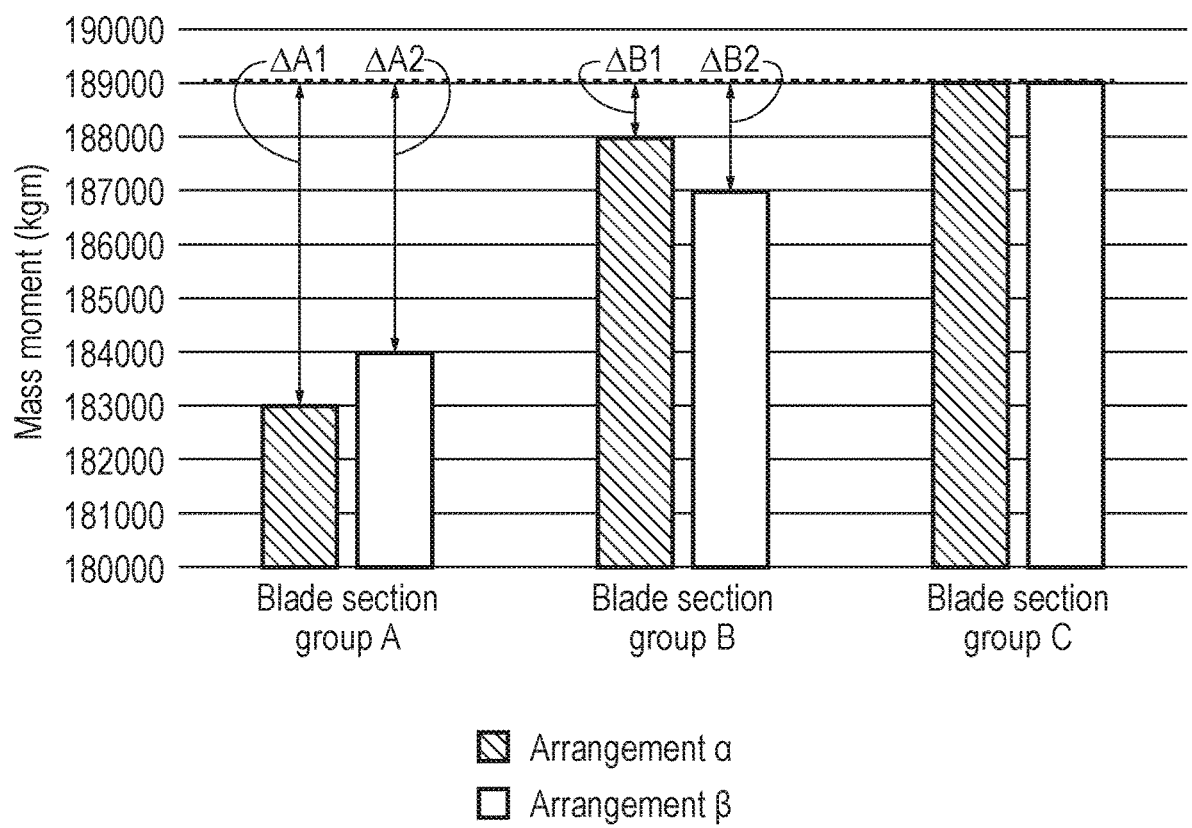
FIG. 6 is a graphical representation of the group mass moment distribution of two blade section group arrangements.

As demonstrated in FIG. 6, there are instances in which may be possible to satisfy the minimised total ballast condition and not the minimised ballasting difference condition. FIG. 6 demonstrates two arrangements, $\alpha$ and $\beta$, in which the diagonally hatched columns represent arrangement $\alpha$ and the clear/white columns represent arrangement $\beta$. Arrangements $\alpha$ and $\beta$ show two of six possible different ways of arranging six blade sections (comprising three root blade sections and three tip blade sections). In both cases, the blade section group having the maximum group mass moment is blade section group C, with a mass moment of 189000 kgm.

With reference to FIG. 6, both arrangement $\alpha$ and arrangement $\beta$ have the same sum of differences between the group mass moment of: the blade section group having the highest group mass moment of the plurality of blade section groups (group C); and each of the remaining blade section groups (groups A and B). In practice, as demonstrated by FIG. 6, the sum of differences is $\Delta A1+\Delta B1$, which equals 7000 kgm, and for arrangement $\beta$ the sum of differences is $\Delta A2+\Delta B2$, which equals 7000 kgm.

More simply put, $\Delta A1+\Delta B1=\Delta A2+\Delta B2$, so the sum of differences $\Delta A+\Delta B$ is the same in each instance.

However, only arrangement β satisfies the minimised ballasting difference condition, as it has a minimisation of $\Delta A2$, i.e. a minimisation of: a difference in mass moment between: the group mass moment of the blade section group having the highest group mass moment of the plurality of blade section groups (i.e. blade section group C); and the group mass moment of the blade section group having the lowest group mass moment of the plurality of blade section groups (i.e. blade section group A). In contrast, this is not true of arrangement α, in which $\Delta A1$ is not minimised, as it is more than $\Delta A2$ (and the smaller magnitude $\Delta A2$ is possible by arranging the blade section groups into different combinations).

A minimisation of a difference in mass moment as defined above under the minimised ballasting difference condition has the direct result of effectively spreading out the mass moment to be added (which in practical terms relates to the mass to be added) between blades. This has the advantage of providing a further balanced arrangement, by distributing supplementary mass (such as ballast 70) added between the 'lighter' blades more evenly.

Each method described herein may further comprise the step of providing ballast 70, or supplementary mass, to at least one of the plurality of blade section groups to provide a mass moment equal to the blade section group having the highest mass moment. Specifically, where a blade section group has a mass moment less than another blade section group, mass is added at a location on the blade section group or blade so as to provide blade section groups having group mass moments equal to each other. The ballast 70 or additional mass may be fixedly or releasably attached to the blade section group, and a person skilled in the art will appreciate that various forms of ballast may be possible. There may be no ballast 70 added to the blade section group having the highest group mass moment of the plurality of blade section groups. This has the advantage of minimising the overall amount of ballast 70 to be added to the blades. Ballast 70 may be provided at or adjacent: an outer end 314 of one or more inner blade sections 310; and/or an inner end 322 of one or more outer blade sections 320. This has the advantage of adding mass at a location at which there is a significant effect on the mass moment of the blade, while ensuring that the blade is structurally resilient enough to support the ballast 70. This also has the advantage of easy access to the location where ballast 70 is to be added. Ballast 70 may be provided substantially centrally on a blade. Ballast may be provided substantially between blade sections of a blade. For example, ballast 70 may be provided at or proximate to a joint between two or more blade section groups.

Addition of ballast 70 may comprise adding material or components which are configured for, suitable for, or adapted for addition to a wind turbine blade, or a wind turbine blade section group. Addition of ballast 70 to a blade section group may comprise adding one or more of: granular material such as sand; a solid material such as a metal; a liquid; a curable fluid, such as a curable polymer, preferably curable polyurethane. A person skilled in the art will appreciate that various forms of ballast or supplementary mass could be used. Addition of a curable fluid has the advantage of allowing a precise and near infinitely variable amount of mass to be added, and allows for any suitable shape of ballast 70 to be easily provided.

Figure 4:
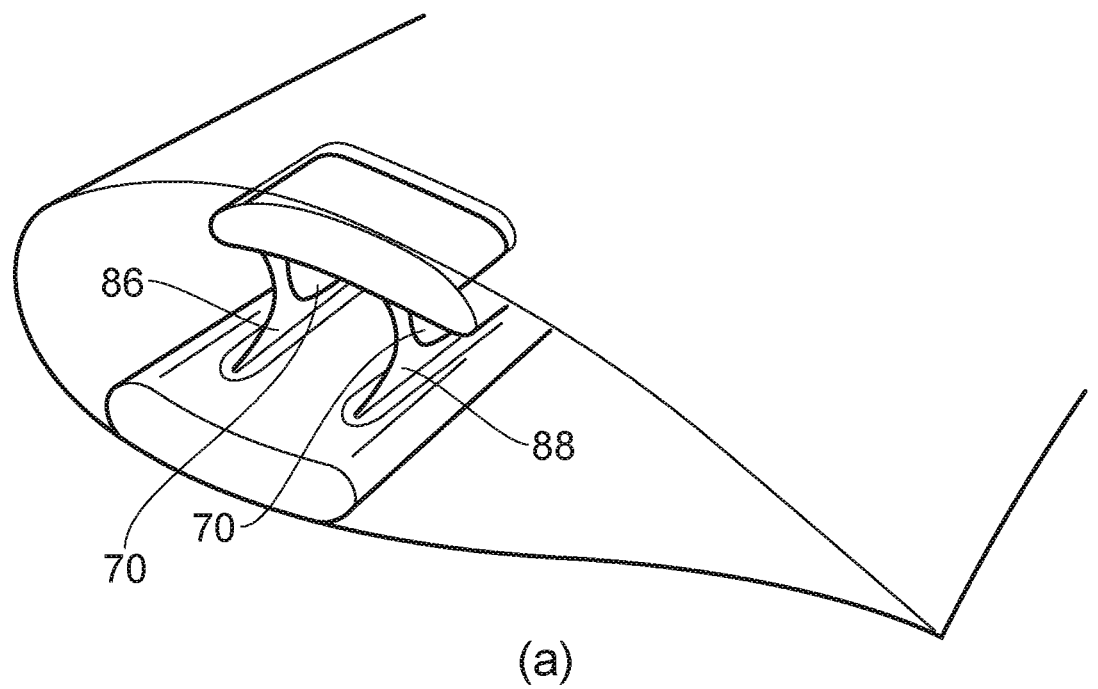
FIG. 4 shows a cross-section through a wind turbine blade with ballast.
Figure 4:
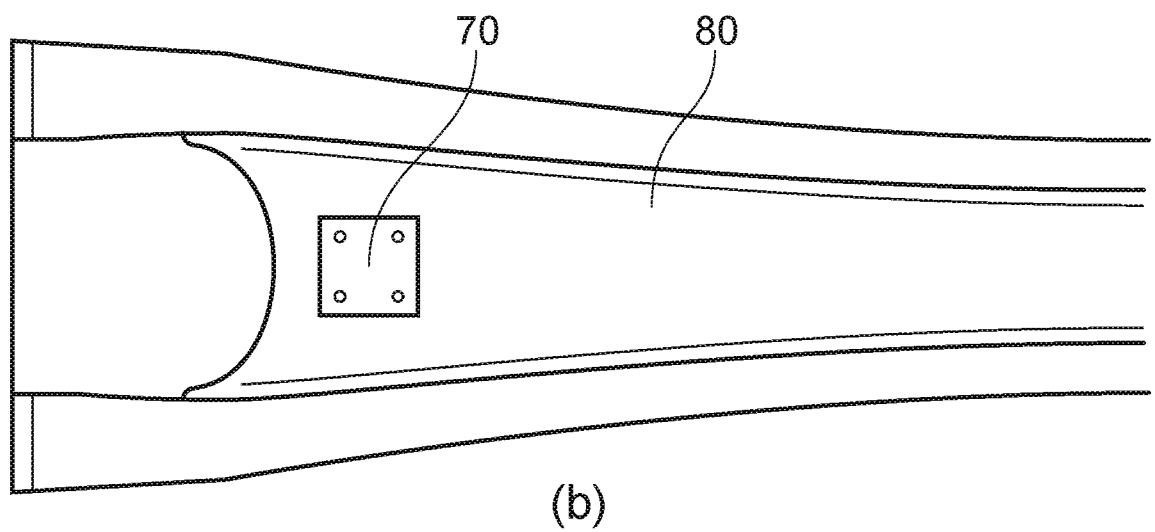
Figure 5:
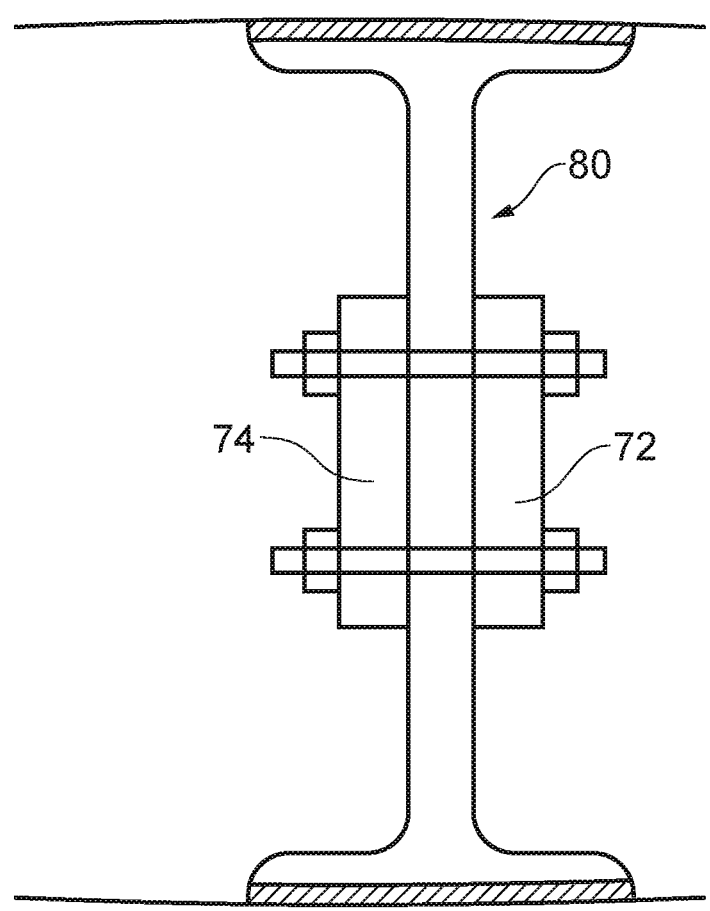
FIG. 5 is a partial view of a wind turbine blade with ballast.

Ballast 70 may be provided as one or more plates, as shown in FIGS. 4 (*a*), (*b*) and 5. Ballast 70 may be added to a shear web portion 80, 86, 88 of one or more of the root or tip blade sections 310, 320, as demonstrated in FIGS. 4 (*a*), (*b*), and 5. This has the advantage of providing a simple arrangement, in which ballast 70 is added to a portion of the wind turbine which does not require significant modification to accommodate the ballast 70. As shown in FIG. 4(*a*), there may be provided two shear web portions 86, 88, and ballast 70 may be provided to each of the shear web portions 86, 88. As shown in FIG. 5, ballast comprising two masses 72, 74 may be added to a shear web portion 80. As shown in FIG. 5, one mass may be provided to a first side of the shear web portion 80, and another mass may be added to a second side of the shear web portion. The first side may be opposite to the second side of the shear web portion 80, as shown in FIG. 5.

The method may further comprise the step of providing identifying means, identifying each root blade section 310, 410, 510 and each tip blade section 320, 420, 520 of the set as belonging to its respective blade section group. The identifying means may comprise a set of instructions, physical or electronic, or a set of markings on the blade itself. This has the advantage of allowing the blade section groups arranged according to the method above to be easily identified as belonging to a certain group. This has associated advantages in terms of ease of manufacture and assembly, and may allow the method of balancing to be carried out at one location, and the blades to be assembled into blades according to their blade section groups at a separate location.

The method may further comprise the step of assembling the root blade section 310 and the at least one tip blade section 320 within each blade section group to one another to form a set of blades 30, 40, 50 for a rotor of a wind turbine 1.

The method may further comprise the step of assembling the plurality of blade section groups onto a wind turbine hub 20, such that each blade section group forms a wind turbine blade 30, 40, 50, the wind turbine blades 30, 40, 50 having an equivalent mass moment, about an axis of rotation 2 of a hub 20 of the turbine 1, to one another.

Ballast 70 may be provided to at least one of the plurality of blade section groups, to provide a mass moment equal to the blade section group having the highest mass moment. This allows for the blades of the turbine to have an equal mass moment to each other, and provides a balanced arrangement.

A person skilled in the art will appreciate that any of the methods described herein may be applied to any of the blade sets described herein.

Although root and tip (or "first" and "second") blade sections have been described herein, various configurations of blade section are possible. A blade may comprise any plurality of blade sections which are assembled to each other. As such, a blade may comprise, one or more inner blade sections and one or more outer blade sections. Although a blade 30 having two blade sections 310, 320 is shown in FIG. 2, any appropriate number of blade sections may be used. There may be provided three blade sections, or four blade sections, or five blade sections, or any appropriate number of blade sections making up a blade. There may for example be provided an inner blade section 310 and an outer blade section 320. The inner blade section 310 may differ in shape and size from the outer blade section 320. The inner blade section 310 may be a root blade section. The outer blade section 320 may be a tip blade section. There may be provided one or more of: an inner blade section, an outer blade section, one or more intermediate blade sections (located between inner and outer sections), and/or a central blade section. Blade sections may be configured for attachment to each other in the radial direction illustrated, or in a circumferential (relative to an axis of the hub) direction, or a leeward section and a windward section may be provided and connected substantially along a chord of an aerofoil of the blade. The first blade section may be any type of blade section. For example, a first blade section may be one or more of: an inner, an outer, a root, a tip, an intermediate, and a central blade section. A second blade section in a same blade may also be one or more of: an inner, an outer, a root, a tip, an intermediate, and a central blade section, so long as the first and second blade sections are not both the same (e.g. not both a root blade section). The blade sections may also comprise a root extender or a winglet for example. A blade section group may for example comprise an inner, an outer, and one or more intermediate blade sections. Although three blade section groups per wind turbine, which gives a set of three blades, have been described herein, any appropriate multiple of blade section groups may be provided, which may provide any appropriate multiple of blades for a wind turbine.

Although the invention has been described above with reference to one or more preferred embodiments, it will be appreciated that various changes or modifications may be made without departing from the scope of the invention as defined in the appended claims.

The invention claimed is:

1. A method of balancing a set of modular blade sections for a set of blades of a rotor of a wind turbine, the method comprising the steps of:
   providing the set of modular blade sections, the set comprising a plurality of first blade sections and a plurality of second blade sections;
   determining a mass moment of each first blade section and of each second blade section, the mass moment being determined about an axis equivalent to an axis of rotation of a hub of the turbine when the blade section is assembled onto the hub; and
   defining a plurality of blade section groups, each comprising a first blade section of the set and at least one second blade section of the set, each blade section group having a blade section group mass moment about the axis, the first blade section and the at least one second blade section in each group being selected so as to:
   minimise a sum of differences between:
      the group mass moment of the blade section group having the highest group mass moment of the plurality of blade section groups; and
      the group mass moment of each of the remaining blade section groups; or
   minimise a difference in mass moment between:
      the group mass moment of the blade section group or groups having the highest group mass moment of the plurality of blade section groups; and
      the group mass moment of the blade section group or groups having the lowest group mass moment of the plurality of blade section groups.

2. The method according to claim 1, wherein each modular blade section in the set of modular blade sections is provided with identifying means, and wherein the method further comprises identifying each first blade section and each second blade section of the set of modular blade sections as belonging to its respective blade section group using the identifying means.

3. The method according to claim 1, further comprising the step of providing ballast to at least one of the plurality of blade section groups to provide a mass moment equal to the blade section group having the highest mass moment.

4. The method according to claim 3, wherein no ballast is added to the blade section group having the highest group mass moment of the plurality of blade section groups.

5. The method according to claim 1, wherein the step of defining a plurality of blade section groups includes providing a blade section group comprising:
   a first blade section having the highest mass moment of the first blade sections; and
   a second blade section having the lowest mass moment of the second blade sections.

6. The method according to claim 1, wherein determining the mass moment of a first or second blade section comprises weighing the first or second blade section.

7. The method according to claim 3, wherein the ballast is provided at or adjacent:
   an outer end of one or more inner blade sections; and/or
   an inner end of one or more outer blade sections.

8. The method according to claim 3, wherein the ballast is added to a shear web portion of one or more of the first or second blade sections.

9. The method according to claim 3, wherein providing the ballast to the at least one blade section groups comprises adding one or more of: a granular material; a solid material; a liquid; and a curable fluid.

10. The method according to claim 1, further comprising the step of assembling the first blade section and the at least one second blade section within each blade section group to one another to form a set of blades for a rotor of a wind turbine.

11. The method according to claim 1, further comprising the step of assembling the plurality of blade section groups onto a wind turbine hub, such that each blade section group forms a wind turbine blade, the wind turbine blades having an equivalent mass moment, about an axis of rotation of a hub of the turbine, to one another.

12. A set of blades for a rotor of a wind turbine, wherein each blade comprises a blade section group comprising a first blade section and at least one second blade section, each blade section group having a blade section group mass moment about an axis equivalent to an axis of rotation of a hub of the turbine when the blade section is assembled onto the hub;
   wherein, excluding any supplementary balancing mass added to the blades, the first blade section and the at least one second blade section in each group are selected so as to:
   minimise a sum of the differences between:
      the group mass moment of the blade section group having the highest group mass moment of the plurality of blade section groups; and
      the group mass moment of each of the remaining blade section groups; or
   minimise a difference in mass moment between:
      the group mass moment of the blade section group or groups having the highest group mass moment of the plurality of blade section groups; and
      the group mass moment of the blade section group or groups having the lowest group mass moment of the plurality of blade section groups.

13. The set of blades according to claim 12, further comprising ballast provided to at least one of the plurality of blade section groups, to provide a mass moment equal to the blade section group having the highest mass moment.

14. The set of blades according to claim 13, wherein the ballast comprises one or more of the following: a granular material, a block or plate of material, and a liquid.

15. The method according to claim 9, wherein adding the granular material further comprises adding sand.

16. The method according to claim 9, wherein adding the solid material further comprises adding metal.

17. The method according to claim 9, wherein adding the curable fluid further comprises adding a curable polymer.

18. The set of blades according to claim 14, wherein the granular material comprises sand.

19. The set of blades according to claim 14, wherein the block or plate of material comprises a steel block or plate.

20. The set of blades according to claim 14, wherein the liquid comprises a curable polymer.

* * * * *